(12) United States Patent
Langford et al.

(10) Patent No.: US 7,734,948 B2
(45) Date of Patent: Jun. 8, 2010

(54) RECOVERY OF A REDUNDANT NODE CONTROLLER IN A COMPUTER SYSTEM

(75) Inventors: John S. Langford, Austin, TX (US); Atit D. Patel, Austin, TX (US); Joshua N. Poimboeuf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/842,409

(22) Filed: Aug. 21, 2007

(65) Prior Publication Data

US 2009/0055679 A1 Feb. 26, 2009

(51) Int. Cl.
*G06F 11/00* (2006.01)

(52) U.S. Cl. .................. 714/4; 714/11; 714/13
(58) Field of Classification Search ............. 714/4, 714/11, 13
See application file for complete search history.

(56) References Cited

U.S. PATENT DOCUMENTS

| | | | |
|---|---|---|---|
| 6,145,089 A * | 11/2000 | Le et al. ............... | 714/4 |
| 6,205,560 B1 | 3/2001 | Hervin et al. | |
| 6,587,966 B1 * | 7/2003 | Chaiken et al. ........ | 714/34 |
| 6,691,225 B1 | 2/2004 | Suffin | |
| 6,880,113 B2 | 4/2005 | Anderson et al. | |
| 6,944,785 B2 * | 9/2005 | Gadir et al. ............ | 714/4 |
| 6,993,681 B2 * | 1/2006 | Haynes et al. ......... | 714/23 |
| 7,093,154 B2 | 8/2006 | Bartfai et al. | |
| 2003/0196136 A1 * | 10/2003 | Haynes et al. ........ | 714/13 |
| 2005/0132237 A1 * | 6/2005 | Barsuk ................ | 713/300 |
| 2006/0010357 A1 * | 1/2006 | D'Alo et al. ......... | 714/100 |
| 2007/0180287 A1 * | 8/2007 | Kumar et al. ......... | 714/4 |
| 2009/0070639 A1 * | 3/2009 | Langford et al. ...... | 714/57 |

OTHER PUBLICATIONS

Lee, et al.; Faults, Symptoms, and Software Fault Tolerance in the Tandum GUARDIAN90[1] Operating System; The Twenty-Third International Symposium on Fault-Tolerant Computing, Digest of Papers; Jun. 22-24, 1993; pp. 20-29; IEEE Computer Society Press; Los Alamitos, CA., USA.

Nam, et al.; Fast Development of Source-Level Debugging System Using Hardware Emulation; 2000; pp. 401-404; IEEE.

Wood, et al.: The Test and Debug Features of the AMD-K7™ Microprocessor; International Test Conference; Sep. 28-30, 1999; pp. 130-136; IEEE Computer Society; Atlantic City, N.J., USA.

* cited by examiner

*Primary Examiner*—Marc Duncan
(74) *Attorney, Agent, or Firm*—H. Artoush Ohanian; Biggers & Ohanian, LLP; Libby Z. Toub

(57) ABSTRACT

Recovery of a redundant node controller in a computer system including determining a loss of a heartbeat for a predefined period of time between a system controller and the redundant node controller; in response to determining the loss of the heartbeat for the predefined period of time, checking network connectivity between the system controller and the redundant node controller; if there is network connectivity between the system controller and the redundant node controller, determining whether an application on the redundant node controller is running; and if an application on the redundant node controller is running, resetting the redundant node controller through a primary node controller.

17 Claims, 5 Drawing Sheets

US 7,734,948 B2

RECOVERY OF A REDUNDANT NODE CONTROLLER IN A COMPUTER SYSTEM

BACKGROUND OF THE INVENTION

1. Field of the Invention

The field of the invention is data processing, or, more specifically, methods, apparatus, and products for recovery of a redundant node controller in a computer system.

2. Description of Related Art

The development of the Electronic Discrete Variable Automatic Computer ('EDVAC') computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The combination of hardware and software components in computer systems today has progressed to the point that computer systems can be highly reliable. Reliability in computer systems may be provided by using redundant components in the computer system. When one component fails another component replaces it. In some computer systems, for example, components such as node controllers that manage hardware error requests in nodes of the computer system are provided in redundant pairs—one primary node controller, one redundant node controller. When such a primary node controller fails, the redundant node controller takes over the primary node controller's operations.

From time to time a redundant node controller loses communication with other components in the computer system. Typical methods of recovery of the redundant node controllers are reactive. That is, recovery of the redundant node controller is not attempted until the redundant node controller is called upon to replace the primary node controller. Recovery of the redundant node controller at this point is typically too late for reliable operations of the node controllers. Because the redundant node controller cannot communicate with other components in the computer system when called upon to replace the primary node controller, the redundant node controller cannot operate effectively as the primary node controller. Reactive recovery of redundant node controllers therefore reduces the reliability of node controllers in a computer system.

In other methods of recovery of redundant node controllers both the redundant node controller and the component with which the redundant node controller lost communication must agree on the failure before attempting recovery of the redundant node controller. Typically, however, one of the components is unaware of the loss of communication due to software errors. In such cases, recovery of redundant node controller is not even attempted. Readers of skill in the art will recognize therefore that there exists room for improvement in recovery of a redundant node controller in a computer system

SUMMARY OF THE INVENTION

Methods, apparatus, and products for recovery of a redundant node controller in a computer system are disclosed that include determining a loss of a heartbeat for a predefined period of time between a system controller and the redundant node controller; in response to determining the loss of the heartbeat for the predefined period of time, checking network connectivity between the system controller and the redundant node controller; if there is network connectivity between the system controller and the redundant node controller, determining whether an application on the redundant node controller is running; and if an application on the redundant node controller is running, resetting the redundant node controller through a primary node controller.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
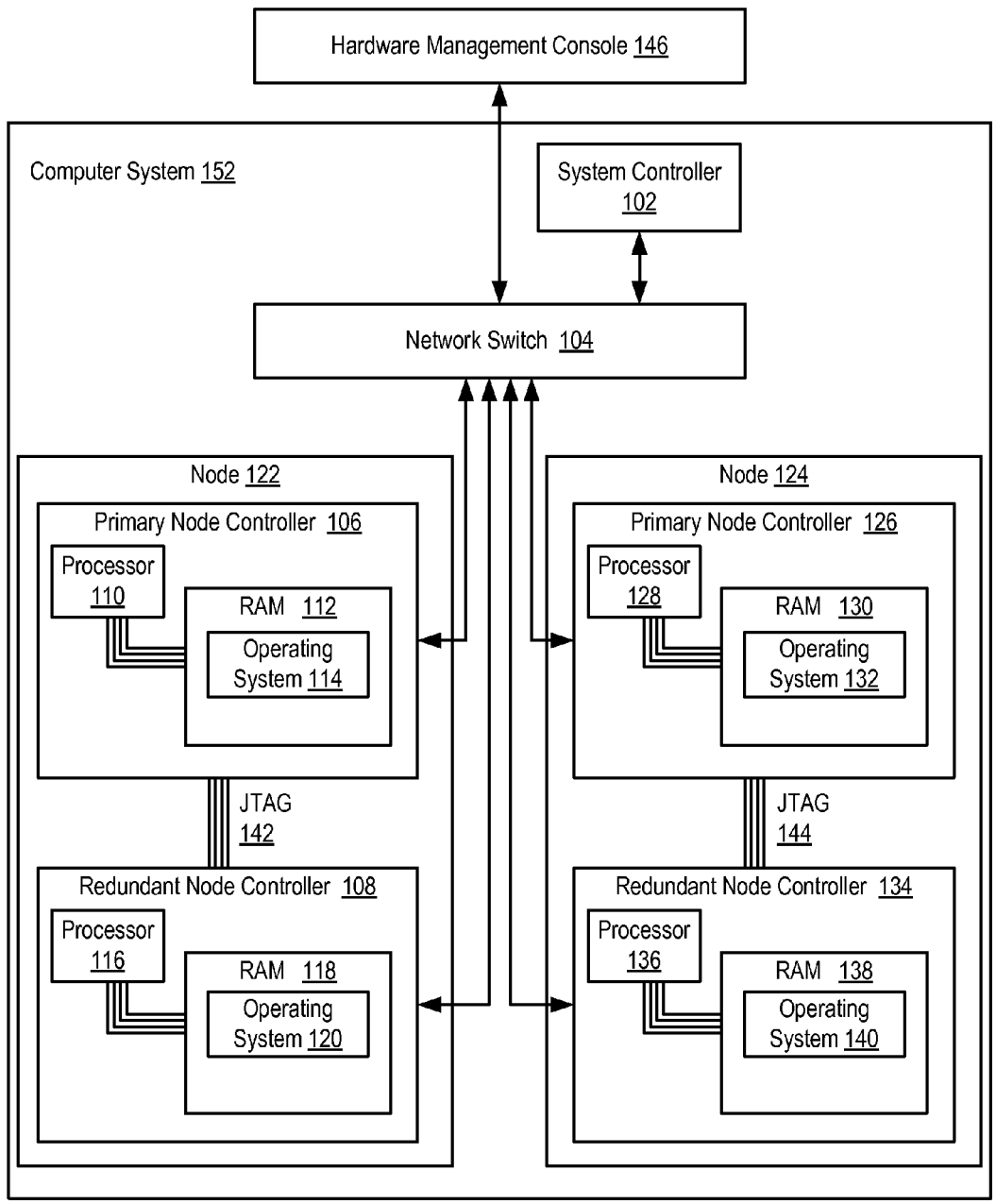
FIG. 1 sets forth a block diagram of automated computing machinery comprising an exemplary computer system useful in recovery of a redundant node controller in the computer system according to embodiments of the present invention.

Exemplary methods, apparatus, and products for recovery of a redundant node controller in a computer system in accordance with the present invention are described with reference to the accompanying drawings, beginning with FIG. 1. FIG. 1 sets forth a block diagram of automated computing machinery comprising an exemplary computer system (152) useful in recovery of a redundant node controller in the computer system according to embodiments of the present invention. The computer system of FIG. 1 is an example of a 'distributed' computer system (152). The term 'distributed' as used in this specification describes a computer system that includes multiple, physically distinct devices that operate together as a single computer system. The computer system (152) of FIG. 1, for example, includes several physically discrete devices such as a system controller, a network switch, and two nodes (122,124).

A node is a processing device contained in computer system that executes user applications. A node may be a web server, a database, or any other computing device. Although not shown here, nodes may include any number of devices such as computer processors, computer memory, disk drive adapters, disk drives, communication adapters, bus adapters, and so on as will occur to those of skill in the art. The computer system (152) of FIG. 1 is configured with only two nodes (122,124), but readers of skill in the art will immediately recognize that computer systems useful in recovery of a redundant node controller according to embodiments of the present invention may include any number of nodes. In typical embodiments of the present invention, for example, a computer system may include from one to eight nodes.

Each node (122,124) in the system of FIG. 1 includes two node controllers configured as a set of buddies. A node controller is a device contained in a node that attends to any hardware error requests of the node that occur during operation of the computer system. In the exemplary computer system (152) of FIG. 1 each node controller (106,108,126, 134) contains a computer processor (110,116,128,136) operatively coupled to computer memory, RAM (112,118, 130,138). Store in RAM in each of the node controllers is an operating system (114,120,132,140). Operating systems useful in node controllers according to embodiments of the present invention include UNIX™, Linux™, Microsoft XP™, Microsoft Vista™, AIX™, IBM's i5/OS™, and others as will occur to those of skill in the art.

As mentioned above the two node controllers contained in each node are configured as a set of buddies. A set of buddies is a group of node controllers that provide, as a group, reliable node controller operations due to redundancy—when one node controller fails another redundant node controller takes over node controller operations for the node of the computer system. In the exemplary computer (152) of FIG. 1, primary node controller's (106) buddy is the redundant node controller (108) and vice versa. Also in the exemplary computer (152) of FIG. 1, primary node controller's (126) buddy is (134) and vice versa.

Only one node controller in a set of buddies is configured as a primary node controller at one time. The primary node controller is the node controller in which all node controller operations are carried out for a node of the computer system. A redundant node controller, in contrast, carries out no node controller operations for the node of the computer system until the primary node controller fails. Communication between node controllers in a node occurs through two different communications channels. Primary, in-band, data communications between the node controllers in a node occurs through the network switch. Such data communications may be carried out using any network protocol such as for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Data communications other than primary data communications, called out-of-band data communications, is carried out through an out-of-band data communications link.

In the system of FIG. 1 the out-of-band data communication links for each set of node controllers are implemented as Joint Test Action Group ('JTAG') data communications links (142). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. Although the out-of-band data communication links in the exemplary system of FIG. 1 are implemented as a JTAG communications link one of skill in the art will recognize that the out-of-band data communication link may be implemented as any data communications link capable of enabling out-of-band communication between node controllers in a node including, for example, such data communications links as:

I²C bus, a serial computer bus invented by Philips that is used to for low-speed communications with peripheral components of a system. The name stands for Inter-Integrated Circuit and is pronounced I-squared-C or sometimes as I-two-C.

1-Wire bus, a device communications bus system designed by Dallas Semiconductor that provides low-speed data, signaling and power over a single wire, in addition to a ground wire. 1-Wire is similar in concept to I²C, but with lower data rates and a much lower cost. It is typically used to communicate with small inexpensive devices.

System Management Bus ('SMBus'), a two-wire bus used for communication with low-bandwidth devices on a motherboard, especially power related chips. Other devices might include temperature sensors and lid switches. A device can provide manufacturer information, indicate its model/part number, save its state for a suspend event, report errors, accept control parameters, and return status using SMB.

Serial Peripheral Interface ('SPI'), a synchronous serial data link standard named by Motorola that operates in full duplex mode. Devices communicate in master/slave mode where the master device initiates the data frame. Multiple slave devices are enabled using separate select lines.

Intelligent platform management bus ('IPMB'), an enhanced implementation of I²C, the IPMB connects a baseboard management controller to other controllers for communication via the intelligent platform management interface ('IPMI') specification. The IPMI specification defines a set of common interfaces to computer hardware and firmware which system administrators can use to monitor system health and manage the system.

Others as will occur to those of skill in the art.

A system controller (102) is a controller that manages nodes in a computer system. System controllers may collect error and operational status information from nodes during the operation of the computer system as well as direct operations of the nodes.

Although only one system controller is shown in FIG. 1 for clarity in some embodiments of the present invention the computer system (152) also includes a redundant system controller to provide reliability. A system controller is connected for data communications to the nodes (122,124) through a network switch (104).

System administrators may use the system controller (102), through a hardware management console (146), to administer hardware contained within the computer system (152). A hardware management console is automated computing machinery and computer program instructions operating on the automated computing machinery that provide a standard interface to users for configuring and operating a computer system. Such a hardware management console is typically connected for data communications to the nodes of the computer system through the network switch (104) or other network device, such as a router.

A network switch is a computer networking device that connects network segments. Devices connected to the network switch may communicate with one other another through any data communications protocol as will occur to those of skill in the art, including, for example, TCP (Transmission Control Protocol), IP (Internet Protocol), HTTP (HyperText Transfer Protocol), WAP (Wireless Access Protocol), HDTP (Handheld Device Transport Protocol), and others. A network switch is typically capable of inspecting data packets from a networked entity as the data packets are received, determining the source and destination device of each packet, and forwarding each data packet to the appropriate destination device. Some network switches are configured for additional operations. The network switch of FIG. 1, for example, is capable of answering queries of the system controller concerning network connectivity. From time to time a system controller may query the network switch to determine if a particular node, or node controller within a particular node, is physically connected to the network.

As mentioned above, the computer system of FIG. 1 is operates generally for recovery of a redundant node controller in the computer system. Recovery of a redundant node controller in the computer system of FIG. 1 includes determining a loss of a heartbeat for a predefined period of time between a system controller (102) and the redundant node controller (108); in response to determining the loss of the heartbeat for the predefined period of time, checking network connectivity between the system controller (102) and the redundant node controller (108); if there is network connectivity between the system controller (102) and the redundant node controller (108); determining whether an application on the redundant node controller (108) is running; and if an application on the redundant node controller (108) is running, resetting the redundant node controller (108) through a primary node controller (106).

The term 'heartbeat' as used in this specification is any signal shared between two devices, the existence of which represents an active communication channel between the devices. The loss of a heartbeat represents a failure of the communication channel between the devices. In the system of FIG. 1, for example, the heartbeat between the system controller (102) and redundant node controller (108) may consist of a ping from the system controller, through the network switch (104) to the redundant node controller (108), followed by a response from the redundant node controller. A ping is a computer network tool used to test whether a particular device is reachable across a network. A ping may be carried out in several ways including, for example, by sending Internet Control Message Protocol ('ICMP') echo request packets to the device through the network and listening for an ICMP echo response, by transmitting between the devices custom ping-pong messages according to the Stream Control Transport Protocol ('SCTP'), or in other ways as will occur to those of skill in the art.

In the system of FIG. 1, determining a loss of a heartbeat for a predefined period of time between a system controller (102) and the redundant node controller (108) may be carried out in several different ways. Determining a loss of the heartbeat may, for example, be carried out by identifying by the system controller (102) a failure by the redundant node controller (108) to respond to pings of the heartbeat for the predefined period of time (304). Alternatively, determining a loss of the heartbeat may, for example, be carried out by identifying by the redundant node controller (108) the failure to receive a ping of the heartbeat from the system controller (102) for the predefined period of time (304).

Consider for further explanation that the predefined period of time is one hour and that the system controller (102) of FIG. 1 is configured to ping the redundant node controller (108) every 15 seconds. If the system controller pings the redundant node controller every 15 seconds for one hour, but does not receive a response from the redundant node controller during the one hour, the system controller determines the loss of the heartbeat.

As an alternative to the system controller (102) determining the loss of heartbeat, the redundant controller may also determine the loss of heartbeat. Consider a predefined period of time equal to 30 seconds. If the redundant node controller does not receive a ping during the 30 second predefined period of time, the redundant node controller determines the loss of the heartbeat. If the redundant node controller determines the loss of the heartbeat, the redundant node controller attempts to re-establish communication with the system controller through the network switch by repeatedly broadcasting a handshake initiation message.

In the system of FIG. 1, checking network connectivity between the system controller (102) and the redundant node controller (108) may be carried out by querying a switch (104) on the network providing data communications between the system controller (102) and the redundant node controller (108). The network switch (104) of FIG. 1 is configured to respond to queries regarding network connectivity of devices. The answer to such a query represents the physical network connectivity of the device. In some cases, for example, a network cable connecting the redundant node controller and the network switch is physically detached. A query from the system controller to the network switch in such a case will identify that the redundant node controller is no longer physically connected to the network switch.

If a loss of the heartbeat occurs but the redundant node controller is unaware of such loss, then the redundant node must be reset in order to re-establish communication with the system controller. In such cases an application on the redundant node continues to run even after the loss of the heartbeat. If, however, the redundant node controller determines the loss of the heartbeat, an application would cease to be running in the redundant node controller because in such a case the redundant node controller resets itself and attempts to re-establish communication with the system controller through the network switch by repeatedly broadcasting a handshake initiation message.

In the system of FIG. 1, determining whether an application on the redundant node controller (108) is running is carried out by determining through the primary node controller (106) whether a clock on the redundant node controller (108) is active. The system controller (102) may determine through the primary node controller (106) whether the clock on the redundant node controller is active by identifying the clock's presence on the primary node controller's buddy line (222) that monitors the redundant node controller's clock. Buddies in a set may be configured to share one or more buddy lines. Buddy lines provide a channel for either buddy in the set to monitor operating parameters of the other buddy in the set. One buddy may monitor its buddy's clock for example. The buddy lines may be implemented as any out-of-band communication link including an $I^2C$ bus, 1-Wire bus, SMBus, SPI, IPMB, and others as will occur to those of skill in the art. In the example of FIG. 1, the primary node controller (106) may monitor the redundant node controller's (108) clock through any out-of-band communications link, such as the JTAG communications link (142).

In the system of FIG. 1, resetting the redundant node controller (108) through a primary node controller (106) includes invoking through the primary node controller (106) a kernel level interrupt on the redundant node controller (108). A primary node controller may invoke a kernel level interrupt on the redundant node controller through an out-of-band data communications link, such as the JTAG communication link (142). The primary node controller invokes such an interrupt by using the JTAG communication link (142) to halt the operation of the redundant node controller, set a bit in the interrupt register of the redundant node controller, the bit representing an instruction to reset, and releasing the redundant node controller from its halted state.

The arrangement of nodes, switch, and system controller making up the exemplary system illustrated in FIG. 1 are for explanation, not for limitation. Computer systems useful according to various embodiments of the present invention may include additional nodes, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
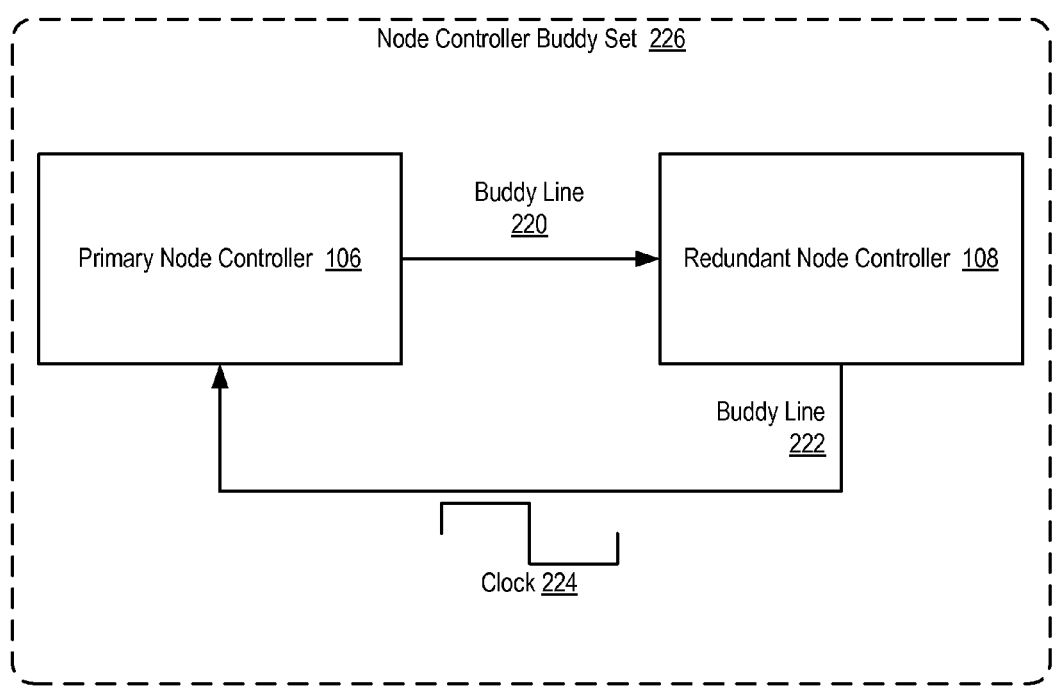
FIG. 2 sets forth a block diagram of a node controller buddy set useful in the recovery of a redundant node controller in a computer system according to embodiments of the present invention.

For further explanation FIG. 2 sets forth a block diagram of a node controller buddy set (226) useful in the recovery of a redundant node controller in a computer system according to embodiments of the present invention. The node controller buddy set (226) of FIG. 2 includes a primary node controller (106) and a redundant node controller (108). The primary and redundant node controllers are connected by two buddy lines (220,222).

Buddies in a set (226) may be configured to share one or more buddy lines. Buddy lines (220,222) provide a channel for either buddy in the set to monitor operating parameters of the other buddy in the set. One buddy may monitor its buddy's clock for example. The buddy lines may be implemented as any out-of-band communication link including a JTAG communications link, I²C bus, 1-Wire bus, SMBus, SPI, IPMB, and others as will occur to those of skill in the art.

Recovery of a redundant node controller (108) in a computer system according to embodiments of the present invention includes determining whether an application on the redundant node controller (108) is running. Determining whether an application on the redundant node controller (108) is running may be carried out by determining through the primary node controller (106) whether a clock on the redundant node controller (108) is active. The buddy set and buddy lines of FIG. 2 enable such determination. The system controller may determine through the primary node controller (106) whether the clock (224) on the redundant node controller (108) is active by identifying the clock's (224) presence on the buddy line (222) that monitors the redundant node controller's clock. If the clock (224) is not present on the buddy line (222) then an application is not running.

Figure 3:
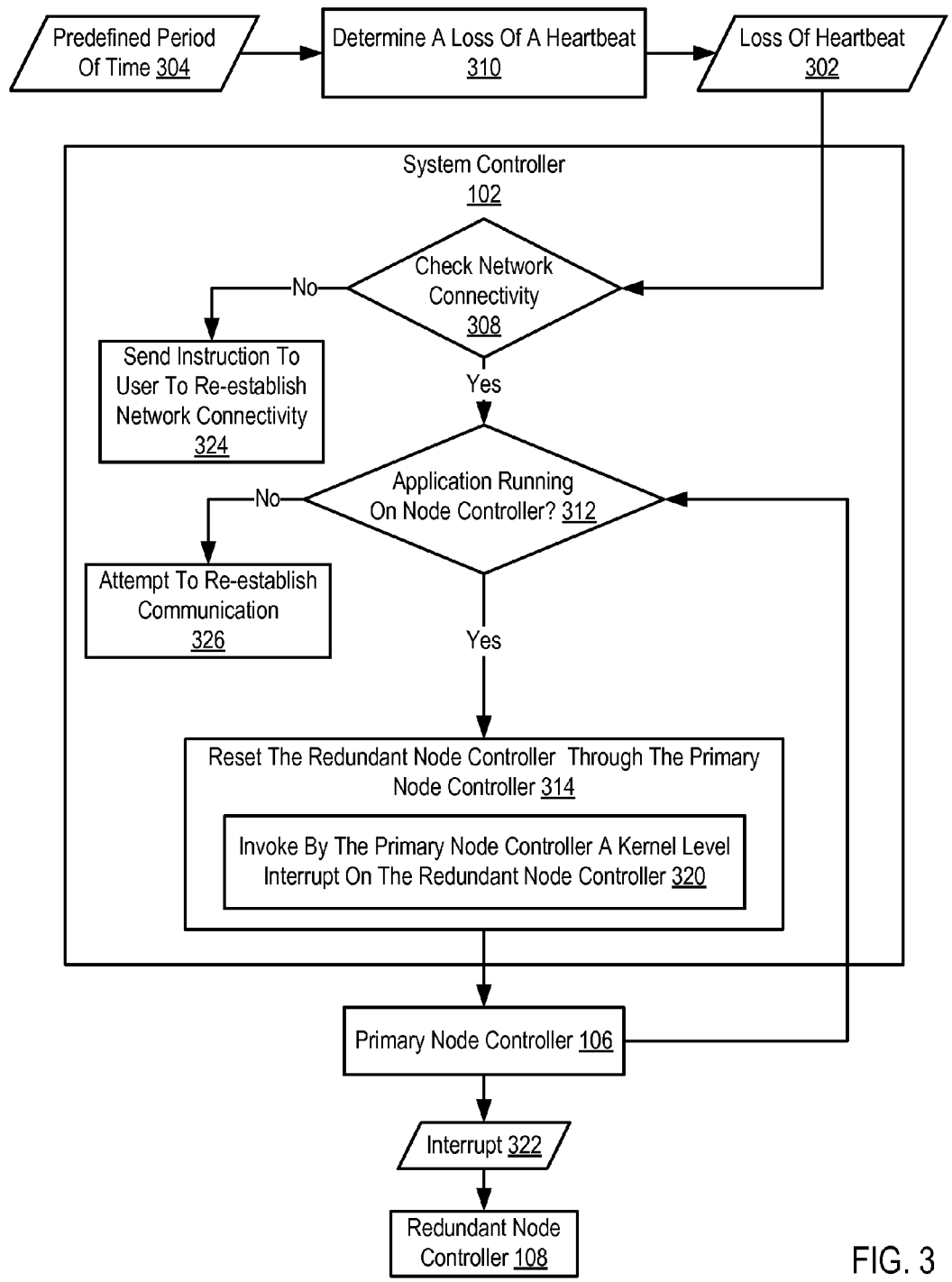
FIG. 3 sets forth a flow chart illustrating an exemplary method for recovery of a redundant node controller in a computer system according to embodiments of the present invention.

For further explanation, FIG. 3 sets forth a flow chart illustrating an exemplary method for recovery of a redundant node controller in a computer system according to embodiments of the present invention. The method of FIG. 3 includes determining (310) a loss of a heartbeat (302) for a predefined period of time (304) between a system controller (102) and the redundant node controller (108). Determining (310) a loss of the heartbeat (302) may be carried out in several ways. Determining (310) a loss of the heartbeat (302) may, for example, be carried out by identifying by the system controller (102) a failure by the redundant node controller (108) to respond to pings of the heartbeat for the predefined period of time (304). Alternatively, determining a loss of the heartbeat may, for example, be carried out by identifying by the redundant node controller (108) the failure to receive a ping of the heartbeat from the system controller (102) for the predefined period of time (304).

In response to determining (310) the loss of the heartbeat (302) for the predefined period of time (304), the method of FIG. 3 also includes, checking (308) network connectivity between the system controller (102) and the redundant node controller (108). In the method of FIG. 3 checking (308) network connectivity between the system controller (102) and the redundant node controller (108) is carried out by querying a switch on the network providing data communications between the system controller (102) and the redundant node controller (108). If there is no network connectivity between the system controller and the redundant node controller, the method of FIG. 3 continues by sending (324) an instruction to the user to re-establish the network connectivity, that is, physically reconnect the system controller and redundant node controller.

If there is network connectivity between the system controller and the redundant node controller, the method of FIG. 3 continues by determining (312) whether an application on the redundant node controller (108) is running. In the method of FIG. 3 determining (312) whether an application on the redundant node controller (108) is running further comprises determining through the primary node controller (106) whether a clock on the redundant node controller (108) is active. If no application on the redundant node controller is running, the system controller and redundant node controller attempt (326) to re-establish communication.

If an application on the redundant node controller is running, the method of FIG. 3 continues by resetting (314) the redundant node controller (108) through a primary node controller (106). In the method of FIG. 3 resetting (314) the redundant node controller (108) through a primary node controller (106) is carried out by invoking (320) through the primary node controller (106) a kernel level interrupt (322) on the redundant node controller (108). Invoking (320) through the primary node controller (106) a kernel level interrupt (322) on the redundant node controller may be carried out by invoking a kernel level interrupt on the redundant node controller through an out-of-band data communications link.

Figure 4:
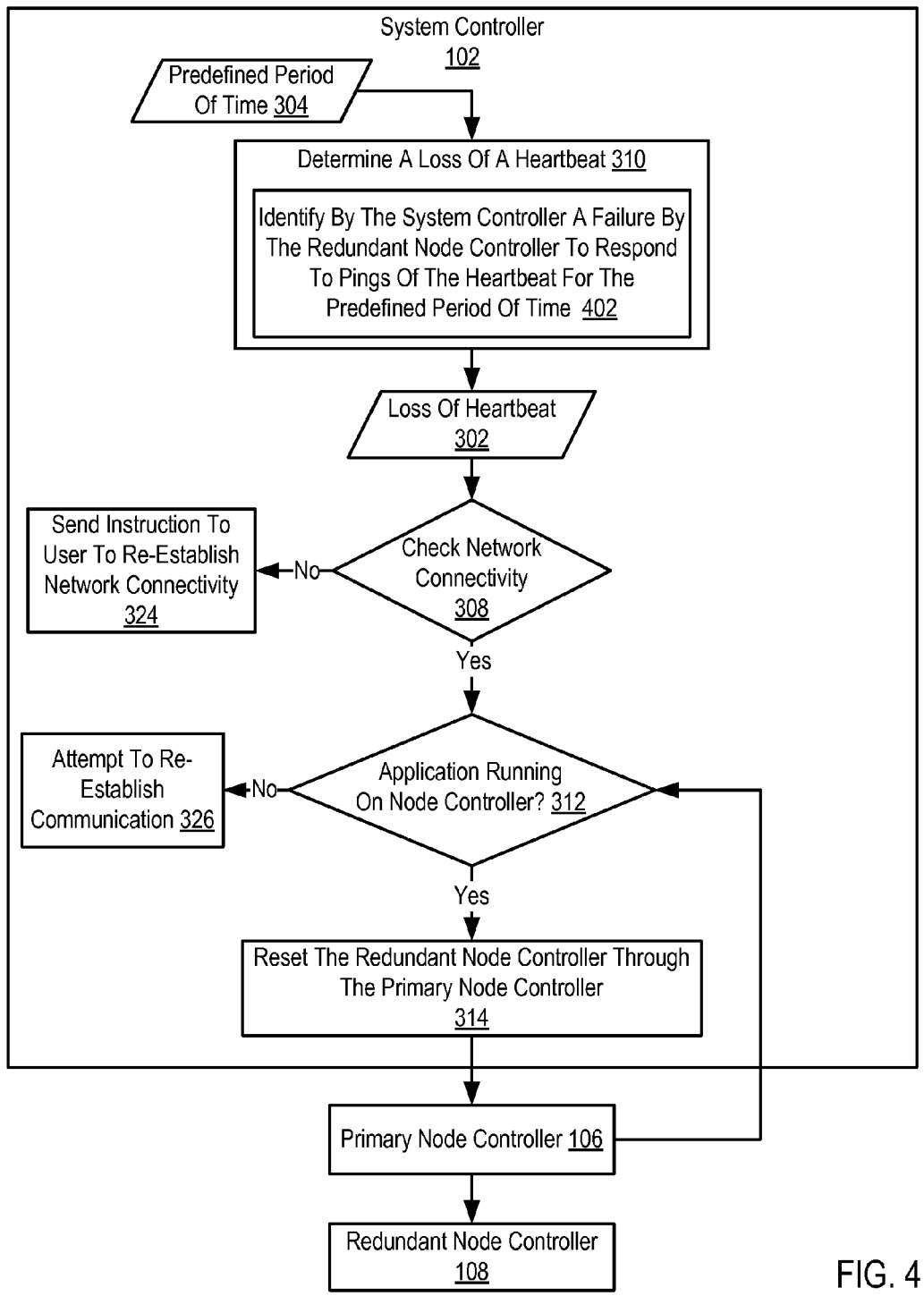
FIG. 4 sets forth a flow chart illustrating a further exemplary method for recovery of a redundant node controller in a computer system according to embodiments of the present invention that includes identifying by a system controller a failure by a redundant node controller to respond to pings of a heartbeat for a predefined period of time.

For further explanation, FIG. 4 sets forth a flow chart illustrating a further exemplary method for recovery of a redundant node controller in a computer system according to embodiments of the present invention. The method of FIG. 4 is similar to the method of FIG. 3, in that, the method of FIG. 4 also includes determining (310) a loss of a heartbeat (302) for a predefined period of time (304) between a system controller (102) and the redundant node controller (108); in response to determining (310) the loss of the heartbeat (302) for the predefined period of time (304), checking (308) network connectivity between the system controller (102) and the redundant node controller (108); if there is network connectivity between the system controller and the redundant node controller, determining (312) whether an application on the redundant node controller (108) is running; and if an application on the redundant node controller is running, resetting (314) the redundant node controller (108) through a primary node controller (106).

The method of FIG. 4 differs from the method of FIG. 3, however, in that in the method of FIG. 4 determining (310) a loss of a heartbeat (302) for a predefined period of time (304) between a system controller (102) and the redundant node controller (108) is carried out by identifying (402) by the system controller (102) a failure by the redundant node controller (108) to respond to pings of the heartbeat for the predefined period of time (304).

As mentioned above, a ping is a computer network tool used to test whether a particular device is reachable across a network. A ping is carried out by sending Internet Control Message Protocol ('ICMP') echo request packets to the device through the network and listening for an ICMP echo response. If the system controller identifies the failure of the redundant node controller to respond to pings during the predefined period of time, then the system controller determines the loss of the heartbeat.

As an alternative to the system controller (102) determining the loss of a heartbeat, the redundant node controller may determine the loss of the heartbeat. For further explanation, therefore, FIG. 5 sets forth a flow chart illustrating a further exemplary method for recovery of a redundant node controller in a computer system according to embodiments of the present invention. The method of FIG. 5 is similar to the method of FIG. 3, in that, the method of FIG. 5 also includes determining (310) a loss of a heartbeat (302) for a predefined period of time (304) between a system controller (102) and the redundant node controller (108); in response to determining (310) the loss of the heartbeat (302) for the predefined period of time (304), checking (308) network connectivity between the system controller (102) and the redundant node controller (108); if there is network connectivity between the system controller and the redundant node controller, determining (312) whether an application on the redundant node controller (108) is running; and if an application on the redundant node controller is running, resetting (314) the redundant node controller (108) through a primary node controller (106).

Figure 5:
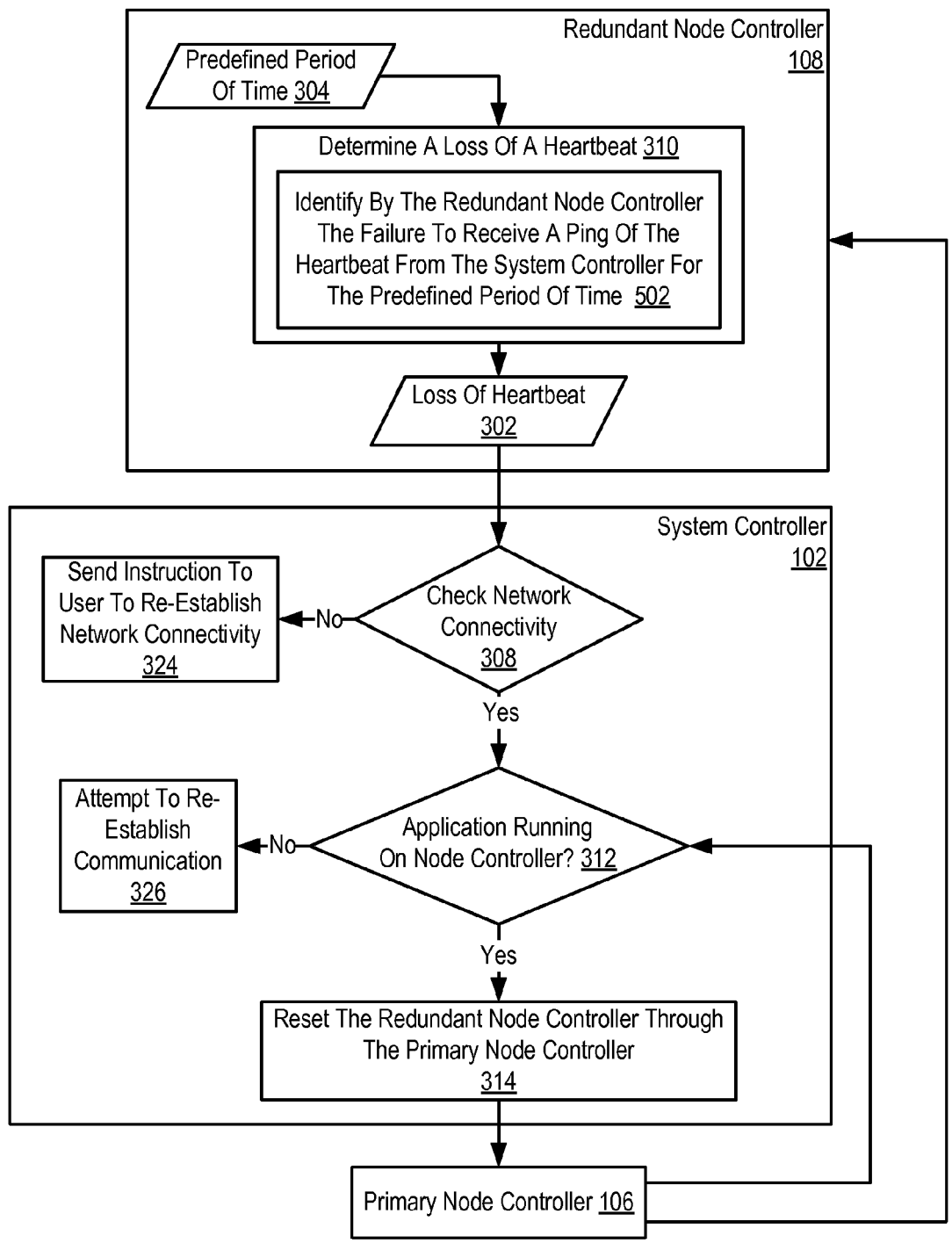
FIG. 5 sets forth a flow chart illustrating a further exemplary method for recovery of a redundant node controller in a computer system according to embodiments of the present invention that includes identifying by a redundant node controller a failure to receive a ping of a heartbeat from a system controller for a predefined period of time.

The method of FIG. 5 differs from the method of FIG. 3, however, in that in the method of FIG. 5 determining (310) a loss of a heartbeat (302) for a predefined period of time (304) between a system controller (102) and the redundant node controller (108) is carried out by identifying (502) by the redundant node controller (108) the failure to receive a ping of the heartbeat from the system controller (102) for the predefined period of time (304).

As mentioned above, a ping is a computer network tool used to test whether a particular device is reachable across a network. A ping is carried out by sending Internet Control Message Protocol ('ICMP') echo request packets to the device through the network and listening for an ICMP echo response. If redundant node controller identifies the failure to receive a ping from the system controller for the predefined period of time, then the redundant node controller determines the loss of the heartbeat. If the redundant node controller determines the loss of the heartbeat, the redundant node controller resets itself and attempts to re-establish communication with the system controller through the network switch by repeatedly broadcasting a handshake initiation message.

Exemplary embodiments of the present invention are described largely in the context of a fully functional computer system for recovery of a redundant node controller in a computer system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of recovery of a redundant node controller in a computer system, the method comprising:

determining a loss of a heartbeat for a predefined period of time between a system controller and the redundant node controller;

in response to determining the loss of the heartbeat for the predefined period of time, checking network connectivity between the system controller and the redundant node controller;

if there is network connectivity between the system controller and the redundant node controller, determining whether an application on the redundant node controller is running including determining through the primary node controller whether a clock on the redundant node controller is active; and if an application on the redundant node controller is running, resetting the redundant node controller through a primary node controller.

2. The method of claim 1 wherein determining a loss of a heartbeat for a predefined period of time between a system controller and the redundant node controller further comprises identifying by the system controller a failure by the redundant node controller to respond to pings of the heartbeat for the predefined period of time.

3. The method of claim 1 wherein determining a loss of a heartbeat between a system controller and the redundant node controller further comprises identifying by the redundant node controller the failure to receive a ping of the heartbeat from the system controller for the predefined period of time.

4. The method of claim 1 wherein checking network connectivity between the system controller and the redundant node controller further comprises querying a switch on the network providing data communications between the system controller and the redundant node controller.

5. The method of claim 1 wherein resetting the redundant node controller through a primary node controller further comprises invoking through the primary node controller a kernel level interrupt on the redundant node controller.

6. The method of claim 5 wherein invoking through the primary node controller a kernel level interrupt on the redundant node controller further comprises invoking a kernel level interrupt on the redundant node controller through an out-of-band data communications link.

7. An apparatus for recovery of a redundant node controller in a computer system, the apparatus comprising a computer processor, a computer memory operatively coupled to the computer processor, the computer memory having disposed within it computer program instructions capable of:

- determining a loss of a heartbeat for a predefined period of time between a system controller and the redundant node controller;
- in response to determining the loss of the heartbeat for the predefined period of time, checking network connectivity between the system controller and the redundant node controller;
- if there is network connectivity between the system controller and the redundant node controller, determining whether an application on the redundant node controller is running including determining through the primary node controller whether a clock on the redundant node controller is active; and
- if an application on the redundant node controller is running, resetting the redundant node controller through a primary node controller.

8. The apparatus of claim 7 wherein determining a loss of a heartbeat for a predefined period of time between a system controller and the redundant node controller further comprises identifying by the system controller a failure by the redundant node controller to respond to pings of the heartbeat for the predefined period of time.

9. The apparatus of claim 7 wherein determining a loss of a heartbeat between a system controller and the redundant node controller further comprises identifying by the redundant node controller the failure to receive a ping of the heartbeat from the system controller for the predefined period of time.

10. The apparatus of claim 7 wherein checking network connectivity between the system controller and the redundant node controller further comprises querying a switch on the network providing data communications between the system controller and the redundant node controller.

11. The apparatus of claim 7 wherein resetting the redundant node controller through a primary node controller further comprises invoking through the primary node controller a kernel level interrupt on the redundant node controller.

12. The apparatus of claim 11 wherein invoking through the primary node controller a kernel level interrupt on the redundant node controller further comprises invoking a kernel level interrupt on the redundant node controller through an out-of-band data communications link.

13. A computer program product for recovery of a redundant node controller in a computer system, the computer program product disposed in a signal bearing recordable medium, the computer program product comprising computer program instructions capable of:

- determining a loss of a heartbeat for a predefined period of time between a system controller and the redundant node controller;
- in response to determining the loss of the heartbeat for the predefined period of time, checking network connectivity between the system controller and the redundant node controller;
- if there is network connectivity between the system controller and the redundant node controller, determining whether an application on the redundant node controller is running including determining through the primary node controller whether a clock on the redundant node controller is active; and
- if an application on the redundant node controller is running, resetting the redundant node controller through a primary node controller.

14. The computer program product of claim 13 wherein determining a loss of a heartbeat for a predefined period of time between a system controller and the redundant node controller further comprises identifying by the system controller a failure by the redundant node controller to respond to pings of the heartbeat for the predefined period of time.

15. The computer program product of claim 13 wherein determining a loss of a heartbeat between a system controller and the redundant node controller further comprises identifying by the redundant node controller the failure to receive a ping of the heartbeat from the system controller for the predefined period of time.

16. The computer program product of claim 13 wherein checking network connectivity between the system controller and the redundant node controller further comprises querying a switch on the network providing data communications between the system controller and the redundant node controller.

17. The computer program product of claim 13 wherein resetting the redundant node controller through a primary node controller further comprises invoking through the primary node controller a kernel level interrupt on the redundant node controller.

* * * * *